(12) United States Patent
Jeong et al.

(10) Patent No.: US 9,316,244 B2
(45) Date of Patent: Apr. 19, 2016

(54) FIBER REINFORCED PLASTIC BOLT AND METHOD FOR PRODUCING THE SAME

(71) Applicants: SK CHEMICALS CO., LTD., Suwon-si, Gyeonggi-do (KR); SAMSUNG HEAVY INDUSTRIES CO., LTD., Seoul (KR)

(72) Inventors: Hoon-Heui Jeong, Suwon-si (KR); Yong-Min Park, Suwon-si (KR); Hyun-Seok Kim, Gwangmyeong-si (KR)

(73) Assignees: SK CHEMICALS CO., LTD., Suwon-Si (KR); SAMSUNG HEAVY INDUSTRIES CO., LTD., Seoul (KR)

( * ) Notice: Subject to any disclaimer, the term of this patent is extended or adjusted under 35 U.S.C. 154(b) by 53 days.

(21) Appl. No.: 13/955,317

(22) Filed: Jul. 31, 2013

(65) Prior Publication Data

US 2013/0315689 A1    Nov. 28, 2013

Related U.S. Application Data

(62) Division of application No. 13/321,414, filed as application No. PCT/KR2010/003564 on Jun. 3, 2010, now Pat. No. 9,028,635.

(30) Foreign Application Priority Data

Jun. 3, 2009    (KR) .................. 10-2009-0048879

(51) Int. Cl.
*F16B 33/00*    (2006.01)
*B29C 70/08*    (2006.01)
(Continued)

(52) U.S. Cl.
CPC ............. *F16B 33/006* (2013.01); *B29C 70/083* (2013.01); *B29C 70/347* (2013.01); *B29C 70/545* (2013.01); *B29L 2001/002* (2013.01)

(58) Field of Classification Search
CPC ............................... F16B 33/006; F16B 35/00
USPC .................................................. 411/424, 908
See application file for complete search history.

(56) References Cited

U.S. PATENT DOCUMENTS 4,063,838 A * 12/1977 Michael ..................... 403/343
4,390,382 A *  6/1983 Matsuda .................. B32B 5/16
                                                              156/184

(Continued)

FOREIGN PATENT DOCUMENTS

FR      2 380 459      9/1978
GB      1 557 762      12/1979

(Continued)

*Primary Examiner* — Flemming Saether
(74) *Attorney, Agent, or Firm* — Birch, Stewart, Kolasch & Birch, LLP

(57) ABSTRACT

A fiber reinforced plastic bolt (FRP) and a method for producing the same are disclosed. The FRP bolt is useful in the industrial areas which require a bolt having electric-insulation, anti-corrosive, thermal-insulation, and non-magnetic properties. The method for producing the FRP bolt includes the steps of: winding a prepreg around a surface of an internal body, wherein the internal body includes a first reinforcing fiber which is unidirectionally aligned along the axis of the bolt, and a synthetic resin which is impregnated into the first reinforcing fiber, and the prepreg includes a second reinforcing fiber and a thermosetting resin which is impregnated into the second reinforcing fiber; forming a fiber reinforced plastic round bar by heat-hardening the prepreg; and forming a screw thread on the surface of the fiber reinforced plastic round bar.

3 Claims, 2 Drawing Sheets

(51) Int. Cl.
*B29C 70/34* (2006.01)
*B29C 70/54* (2006.01)
*B29L 1/00* (2006.01)

(56) References Cited

U.S. PATENT DOCUMENTS

| | | | |
|---|---|---|---|
| 4,568,582 A * | 2/1986 | Kikuzawa | B29C 53/585 428/34.5 |
| 4,623,290 A | 11/1986 | Kikuzawa et al. | |
| 4,863,330 A * | 9/1989 | Olez et al. | 411/424 |
| 5,057,257 A * | 10/1991 | Neitzke | 264/138 |
| 5,234,765 A * | 8/1993 | Taylor et al. | 428/365 |
| 5,292,215 A * | 3/1994 | Roberts, III | 411/424 |
| 5,591,524 A * | 1/1997 | Pohn et al. | 428/367 |
| 6,113,826 A * | 9/2000 | Tajima et al. | 264/159 |
| 6,709,347 B1 * | 3/2004 | Ono | A01K 87/00 280/819 |
| 8,172,484 B2 * | 5/2012 | Tsukamoto | 405/259.1 |
| 8,383,921 B2 * | 2/2013 | Yamamoto | G10D 3/16 84/325 |
| 8,883,060 B2 * | 11/2014 | Nakamura | B29C 70/32 156/173 |
| 2009/0110901 A1 * | 4/2009 | Gaw et al. | 428/297.4 |
| 2012/0275879 A1 * | 11/2012 | Hecht | 411/424 |

FOREIGN PATENT DOCUMENTS

| | | |
|---|---|---|
| JP | 48-37932 S | 11/1973 |
| JP | S61-182932 | 8/1986 |
| JP | 6-114859 | 4/1994 |
| JP | 6-114859 A | 4/1994 |
| JP | 7-19220 A | 1/1995 |
| JP | 7-279933 A | 10/1995 |
| JP | 9-177748 A | 7/1997 |
| JP | 9-229039 A | 9/1997 |
| JP | 10-266798 A | 10/1998 |
| JP | 2000-301612 | 10/2000 |
| JP | 2003-56536 A | 2/2003 |
| JP | 2003-201800 A | 7/2003 |

* cited by examiner

FIBER REINFORCED PLASTIC BOLT AND METHOD FOR PRODUCING THE SAME

CROSS-REFERENCE TO RELATED APPLICATIONS

This application is a Divisional of co-pending application Ser. No. 13/321,414 filed on Nov. 18, 2011, application Ser. No. 13/321,414 is a National Phase of PCT International Application No. PCT/KR2010/003564 filed on Jun. 3, 2010, which claims priority under 35 U.S.C. 119(a) to Patent Application No. 10-2009-0048879 filed in the Republic of Korea on Jun. 3, 2009, all of which are hereby expressly incorporated by reference into the present application.

TECHNICAL FIELD

This invention relates to a fiber reinforced plastic bolt and a method for producing the same. The fiber reinforced plastic bolt is particularly useful in the industrial areas which require a bolt having electric-insulation, anti-corrosive, thermal-insulation, and non-magnetic properties.

BACKGROUND ART

Fiber reinforced plastic (FRP) is prepared by impregnating synthetic resin such as epoxy resin, vinylester resin, phenol resin, and so on into reinforcing fiber such as glass fiber, carbon fiber, aramid fiber and so on. The fiber reinforced plastic is generally used in various areas which require electric-insulation, thermal-insulation, and non-magnetic properties, and is also used as a structural reinforcing material in civil engineering and construction industry. The fiber reinforced plastic is also used to manufacture an article such as a bolt or a nut for fixing substances.

FIGS. 3 and 4 are drawings for illustrating a method for producing a FRP bolt in accordance with a conventional method. As shown in FIG. 3, in the conventional method, reinforcing long-fiber 12 is impregnated with liquid-phase synthetic resin, and is pultruded with a thermoforming die 20 while being transported in parallel. The pultruded and synthetic resin impregnated fiber is hardened to form a FRP round bar 14. The hardened round bar 14 is cut with a cutter 22 to a predetermined length. As shown in drawing A in FIG. 4, the surface of the FRP round bar 14 is ground with a bite 24 of a screw cutting device to form a screw thread of a FRP bolt 16. As shown in drawing B in FIG. 4 which is a longitudinal sectional view of the produced FRP bolt 16, the produced FRP bolt 16 has long-fiber 12 which is unidirectionally aligned along the axis of the bolt 16. Thus, the screw thread of the FRP bolt 16 is easily damaged by an external force, and the FRP bolt 16 is not suitable for connecting structures or substances in which a strong force is applied. In other words, as the surface of the FRP round bar 14 is ground away to form the screw thread of the FRP bolt 16, the reinforcing long-fiber 12 (filament) in the screw thread is cut off, the mechanical strength of the long-fiber 12 is deteriorated, and the tensile strength of the FRP bolt 16 is also deteriorated.

Meanwhile, in order to increase the strength of screw thread of a FRP bolt, Japanese Patent Laid-Open No. H07-279933 discloses a bolt having an internal body and a screw thread which are made of different materials from each other, wherein the screw thread covers the internal body and is produced by a molding process. However, the resin impregnation process and the hardening process in a mold are complicated in the method, and thus the productivity of the bolt is not desirable. Alternatively, Japanese Patent Laid-Open No. H06-114859 discloses a method for producing a bolt including the step of forming a round bar made of reinforcing fiber impregnated with thermoplastic resin with the first mold, and forming the round bar into a bolt having a screw thread with the second mold. However, this method requires a molded preform made of thermoplastic resin, and the preform should be molded again. Thus, the method is not desirable in its productivity. Furthermore, for producing a screw thread of a FRP bolt by a molding process, several molds should be prepared for each type or size of the bolt, which result in the high production cost and the low productivity.

DISCLOSURE

Technical Problem

Therefore, it is an object of the present invention to provide a fiber reinforced plastic bolt having a screw thread of high strength. It is other object of the present invention to provide a method for producing a fiber reinforced plastic bolt having a superior quality with a desirable productivity.

Technical Solution

In order to achieve these and other objects, the present invention provides a method for producing a fiber reinforced plastic bolt comprising the steps of: winding a prepreg around a surface of an internal body, wherein the internal body includes the first reinforcing fiber which is unidirectionally aligned along the axis of the bolt, and a synthetic resin which is impregnated into the first reinforcing fiber, and the prepreg includes the second reinforcing fiber and a thermosetting resin which is impregnated into the second reinforcing fiber, forming a fiber reinforced plastic round bar by heat-hardening the prepreg; and forming a screw thread on the surface of the fiber reinforced plastic round bar. The present invention also provides a fiber reinforced plastic bolt comprising: an internal body which includes the first reinforcing fiber unidirectionally aligned along the axis of the bolt, and a synthetic resin which is impregnated into the first reinforcing fiber, and a hardened prepreg layer which is wound around the internal body, and includes the second reinforcing fiber and a thermosetting resin which is impregnated into the second reinforcing fiber, wherein a screw thread is formed on an outer surface of the hardened prepreg layer.

Advantageous Effects

In the fiber reinforced plastic (FRP) bolt of the present invention, a screw thread is formed on the hardened prepreg layer having the second reinforcing fiber. The hardened prepreg layer is formed by winding the prepreg around the internal body at least one turn. Therefore, even if the second reinforcing fiber is partially cut or damaged by forming the screw thread, the second reinforcing fiber remains intact and is directed in a circular direction of the screw thread. The remaining reinforcing fiber increases the strength of the screw thread. Furthermore, in the FRP bolt of the present invention, the internal body and the hardened prepreg layer firmly bind together, which increases the tensile strength of the FRP bolt.

DETAILED DESCRIPTION OF THE INVENTION

A more complete appreciation of the invention, and many of the attendant advantages thereof, will be better appreciated by reference to the following detailed description.

Figure 1:
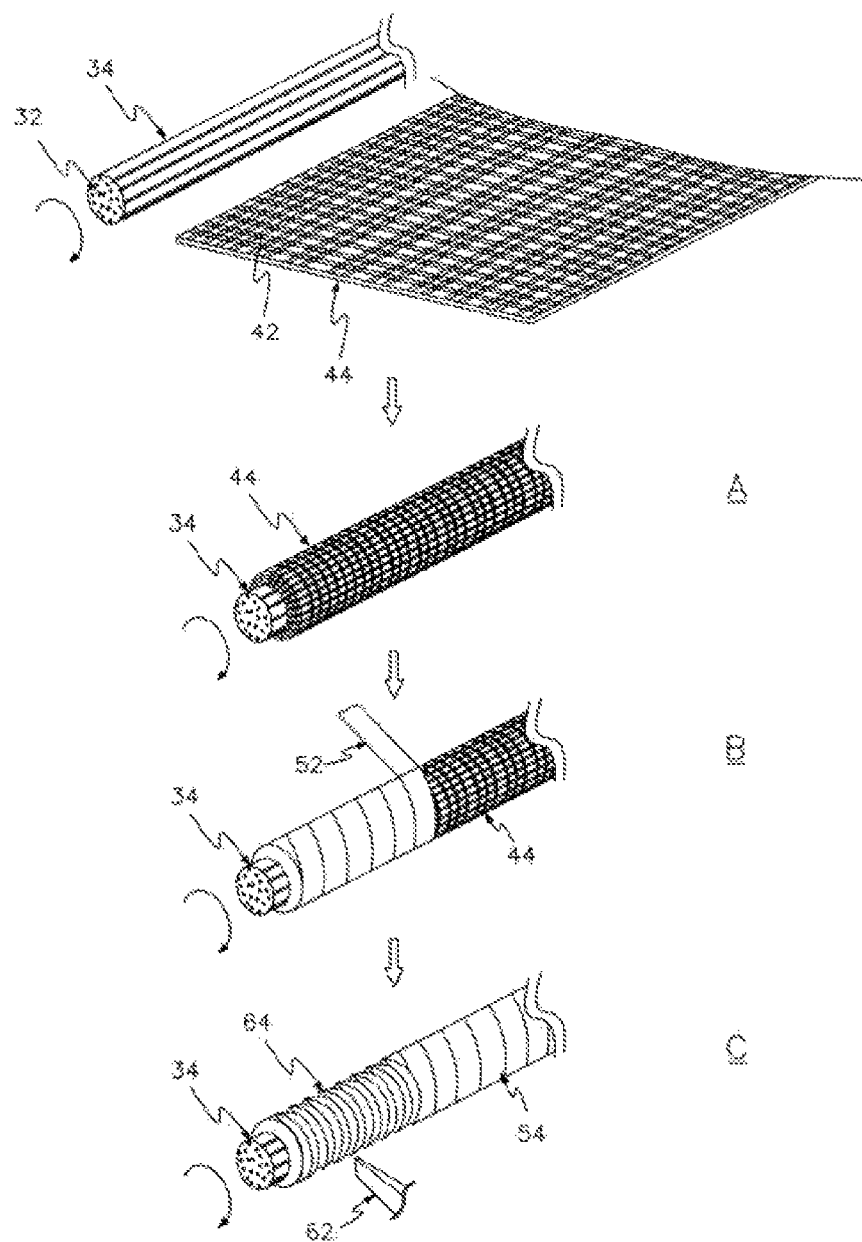
FIG. 1 is a drawing for illustrating a method for producing a FRP bolt according to an embodiment of the present invention.

FIG. 1 is a drawing for illustrating a method for producing a FRP bolt according to an embodiment of the present invention. As shown in FIG. 1, the method for producing a FRP bolt according to an embodiment of the present invention includes the step of winding a prepreg 44 around the surface of an internal body 34 (See drawing A of FIG. 1). The internal body 34 includes the first reinforcing fiber 32 which is unidirectionally aligned along the axis of the bolt, and a synthetic resin which is impregnated into the first reinforcing fiber 32. The prepreg 44 includes the second reinforcing fiber 42 and a thermosetting resin which is impregnated into the second reinforcing fiber 42. Preferably, as shown in FIG. 1, the internal body 34 has the shape of a round bar, and the prepreg 44 has the shape of a sheet. The winding of the prepreg 44 around the internal body 34 can be carried out at least 1 turn, preferably 2~50 turns, more preferably 10~40 turns so that a screw thread can be formed on the wound prepreg layer. Then, the wound prepreg 44 is heat-hardened to form a fiber reinforced plastic round bar 54. Preferably, the heat-hardening can be carried out by winding a heat shrinkable film 52 around the surface of the wound prepreg 44 and heating the heat shrinkable film 52 and the prepreg 44 (See drawing B of FIG. 1). By the heat-hardening, the internal body 34 and the layer of the prepreg 44 firmly bind together. Next, the screw thread is formed on the surface of the fiber reinforced plastic round bar 54 with a cutting device 62 such as a bite to produce the FRP bolt 64 of the present invention (See drawing C of FIG. 1).

In the internal body 34, the first reinforcing fiber 32 is used to reinforce the synthetic resin, and examples of the first reinforcing fiber 32 include carbon fiber, glass fiber, aramid fiber, mixtures thereof, and so on. The selection of the first reinforcing fiber 32 depends on the use or the required properties of the produced FRP bolt 64. The internal body 34 mainly increases the bending resistance of the FRP bolt 64. Thus, the preferable first reinforcing fiber 32 is long fiber rather than short staple or monofilament, and is unidirectionally aligned along the direction of the internal body 34 and the FRP bolt 64. If the short staple or monofilament is used as the first reinforcing fiber 32, the mechanical strength of the FRP bolt 64 may not be satisfactory. Thus, the more preferable first reinforcing fiber 32 is long fiber continuously extended along the direction of the internal body 34. Examples of the synthetic resin for impregnating the first reinforcing fiber 32 include epoxy resin, polyester resin, vinylester resin, phenol resin, mixtures thereof, and so on. In the internal body 34, the volume amount (Vf) of the first reinforcing fiber 32 is preferably 10~90%, more preferably 30~80%, and most preferably 45~60% based on the total volume of the internal body 34. If the volume amount (VT) of the first reinforcing fiber 32 is less than the above-mentioned range, the bending resistance of the FRP bolt 64 may be unsatisfactory. If the volume amount (VT) of the first reinforcing fiber 32 is more than the above-mentioned range, the internal body 34 may not be properly formed and void can be produced between the first reinforcing fiber 32, which deteriorate the mechanical strength of the internal body 34. The internal body 34 can be produced by pultruding the first reinforcing fiber 32 and the synthetic resin. For example, the internal body 34 has a shape of a round bar or a circular cylinder having a diameter of 1~50 mm, preferably 3~20 mm. If necessary, before winding the prepreg 44, the surface of the internal body 34 can be polished and washed.

The second reinforcing fiber 42 used in the prepreg 44 can also be made of carbon fiber, glass fiber, aramid fiber, and mixtures thereof. The shape of the second reinforcing fiber 42 can be selected from the group consisting of fabric (plain fabric, plain weave, satin weave, etc) which is woven with long fiber, unidirectionally aligned long fiber, multidirectionally, i.e., randomly aligned short staple or monofilament sheet, non-woven fabric of short staple or monofilament, mixtures thereof, and so on. In this case, the length of the short staple or the monofilament is generally 1~100 mm, and preferably 2~50 mm. Considering the workability and the productivity for producing the FRP bolt 64, the more preferable second reinforcing fiber 42 has the shape of fabric or non-woven fabric. When a plain fabric shaped reinforcing fiber 42 is used as the second reinforcing fiber 42, the angle between the direction of the internal body 34 and the fiber in the plain fabric shaped reinforcing fiber 42 is between 0~90 degree, for example, between 10~80 degree, more specifically between 30~60 degree. For example, as shown in FIG. 1, if the long fibers of the fabric shaped reinforcing fiber 42 which direct to a horizontal direction and a vertical direction (i.e., perpendicularly, with 90 degree) are wound in parallel around the internal body 34, the angles between the internal body 34 and fibers in the reinforcing fiber 42 are 0 degree and 90 degree. Meanwhile, if the long fibers in the fabric shaped reinforcing fiber 42 which direct to a horizontal direction and a vertical direction (i.e., perpendicularly, with 90 degree) are wound around the internal body 34 with the angle of 45 degree, the angles between the internal body 34 and the fibers in the reinforcing fiber 42 are 45 degree and −45 degree. For increasing the strength of the FRP bolt 64, the angles are preferably 0 degree and 90 degree.

As the thermosetting resin which is impregnated into the second reinforcing fiber 42 in the prepreg 44, the synthetic resin useful for the internal body 34 can also be used. Specific examples of the thermosetting resin include epoxy resin, polyester resin, vinylester resin, phenol resin, mixtures thereof, and so on. It is preferable that the thermosetting resin can be hardened within 120 minutes at the temperature of 80~250° C. As the resins for the prepreg 44 and the internal body 34, different resins can be used. However, if same kind of resin is used for the prepreg 44 and the internal body 34, the binding strength between the internal body 34 and the prepreg 44 may increase.

In the thermosetting prepreg 44, the volume amount (Vf) of the second reinforcing fiber 42 is preferably 10~90%, more preferably 30~80%, and most preferably 45~60% (in this case, the volume amount (Vf) of the resin is 40~55%) based on the total volume of the prepreg 44. If the volume amount (Vf) of the second reinforcing fiber 42 is less than the above-mentioned range, the strength of the screw thread may be insufficient. If the volume amount (Vf) of the second reinforcing fiber 42 is more than the above-mentioned range, the amount of resin in the prepreg 44 is insufficient, and the winding of the prepreg 44 on the internal body 34 cannot be properly performed, and the quality of the FRP bolt 64 may be deteriorated. In the thermosetting prepreg 44, the weight of the second reinforcing fiber 42 is preferably 5~500 g/m². Preferably, the prepreg 44 has the shape of a sheet, and the preferable thickness of the sheet is 0.02~2.5 mm. The number of turns of the prepreg 44 wound around the internal body 34 can be determined according to the depth of the screw thread, and the preferable number of the turns is 2~50.

For heat-hardening the prepreg 44 which is wound on the internal body 34, the internal body 34 and the prepreg 44 can be inserted into a mold having a smaller diameter than the diameter of the prepreg 44, and heat and pressure can be applied to the prepreg 44 in the mold for the heat-hardening. However, in this case, several molds should be prepared for each type, size or diameter of the prepreg 44, which results in the high production cost and the low productivity. Therefore, in the present invention, a heat shrinkable film 52 is preferably used for the heat-hardening process. Specifically, the heat shrinkable film 52 is wound around the prepreg 44, and heat and pressure are applied to the heat shrinkable film 52, the prepreg 44 and the internal body 34, for example, in an oven, to produce the fiber reinforced plastic round bar 54. The conventional heat shrinkable film can be used in the present invention. The heat shrinkable film 52 can be made of polypropylene, polyester, and so on, and the shrinkage ratio of the heat shrinkable film 52 can be controlled so that the prepreg 44 is heat-hardened to have a predetermined size according to the properties of the prepreg 44 and the internal body 34. The prepreg 44 has been conventionally used in producing a round bar such as a fishing pole, a golf shaft, and so on, and is suitable for producing the round bar in large quantity.

Next, the screw thread is formed on the surface of the fiber reinforced plastic round bar 54, more specifically, on the hardened prepreg 44 to produce the FRP bolt 64. The screw thread can be formed with a conventional cutting device 62 such as a bite for grinding a screw thread. In forming the screw thread, it is preferable that the root of the screw thread is formed in the hardened prepreg layer 44, rather than in the internal body 34. More preferably, the distance between the root of the screw thread and the internal body 34, in other words, the minimum thickness of the non-grinded and remaining prepreg 44 is more than 0.1 mm, more preferably 0.5 mm, specifically 0.5~5 mm. If the distance between the root of the screw thread and the internal body 34 is less than 0.1 mm, the prepreg 44 forming the screw thread can be separated from the internal body 34, and the tensile strength of the screw thread may decrease.

Figure 2:
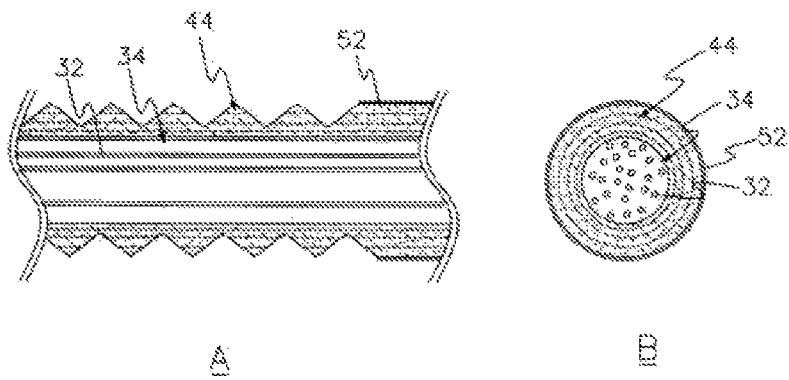
FIG. 2 shows a longitudinal sectional view (A) and a cross sectional view (B) of a FRP bolt according to an embodiment of the present invention.
Figure 3:
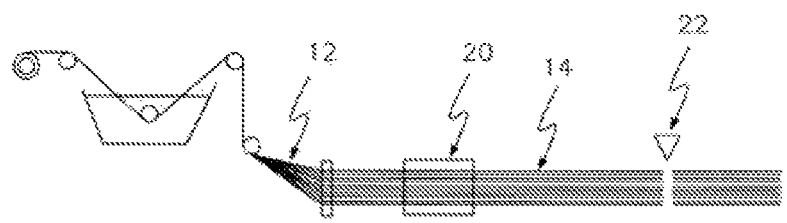
FIGS. 3 and 4 are drawings for illustrating a method for producing a FRP bolt according to a conventional method.
Figure 4:
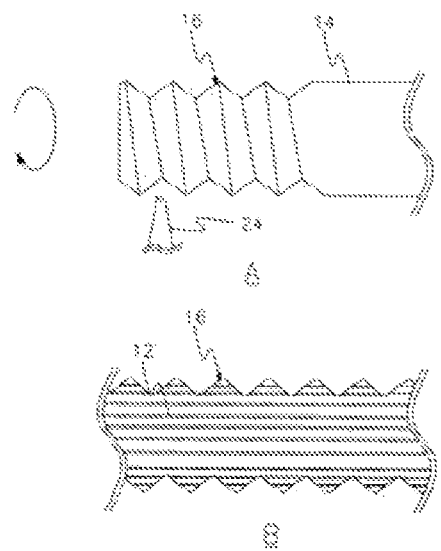

FIG. 2 shows a longitudinal sectional view (A) and a cross sectional view (B) of a FRP bolt according to an embodiment of the present invention. As shown in FIG. 2, the FRP bolt 64 of the present invention has a multi-layer structure, which comprises the internal body 34 which includes the first reinforcing fiber 32 unidirectionally aligned along the axis of the bolt, and a synthetic resin which is impregnated into the first reinforcing fiber 32, and the hardened prepreg layer 44 which is wound around the internal body 32, and includes the second reinforcing fiber 42 and a thermosetting resin which is impregnated into the second reinforcing fiber 42, wherein a screw thread is formed on an outer surface of the hardened prepreg layer 44. If desirable, the heat shrinkable film 52 is wound around the prepreg 44 where the screw thread is not formed as shown in drawing C of FIG. 1. In the FRP bolt of the present invention, the screw thread is formed on the prepreg 44, and the prepreg 44 firmly binds with the internal body 34, which increase the strength of the screw thread.

Hereinafter, the preferable examples and comparative examples are provided for better understanding of the present invention. However, the present invention is not limited by the following examples.

EXAMPLE 1

Preparation of FRP Bolt

A round bar (internal body) having the diameter of 8 mm which included glass fiber unidirectionally aligned along the bar's axis and epoxy resin impregnated into the glass fiber was prepared by a pultrusion method. A fabric prepreg having the thickness of 0.13 mm which included plain fabric structured glass fiber and epoxy resin impregnated into the glass fiber was wound around the round bar (internal body). The angles between the fiber of the fabric prepreg and the axis of the round bar were 0 degree and 90 degree. Then, a polypropylene heat shrinkable film having the width of 15 mm and the thickness of 30 micron was wound around the prepreg with a tensile force of 3 kgf and a pitch of 1.5 mm. The wound prepreg was hardened for 80 minutes at 125° C. to produce a FRP round bar having the diameter of 13 mm. The hardened prepreg was grinded with a cutting device to form a screw thread (pitch: 1.5, M12). The depth of the screw thread was controlled so that the distance between the root of the screw thread and the internal body is 1.2 mm.

EXAMPLE 2

Preparation of FRP Bolt

A round bar (internal body) having the diameter of 8 mm which included glass fiber unidirectionally aligned along the bars axis and epoxy resin impregnated into the glass fiber was prepared by a pultrusion method. A fabric prepreg having the thickness of 0.13 mm which included plain fabric structured glass fiber and epoxy resin impregnated into the glass fiber was wound around the round bar (internal body). The angles between the fiber of the fabric prepreg and the axis of the round bar were 45 degree and −45 degree. Then, a polypropylene heat shrinkable film having the width of 15 mm and the thickness of 30 micron was wound around the prepreg with a tensile force of 3 kgf and a pitch of 1.5 mm. The wound prepreg was hardened for 60 minutes at 125° C. to produce a FRP round bar having the diameter of 13 mm. The hardened prepreg was grinded with a cutting device to form a screw thread (pitch: 1.5, M12). The depth of the screw thread was controlled so that the distance between the root of the screw thread and the internal body is 1.2 mm.

COMPARATIVE EXAMPLE

Preparation of FRP Bolt

A FRP round bar having the diameter of 13 mm which included glass fiber unidirectionally aligned along the bar's axis and epoxy resin impregnated into the glass fiber was prepared by a pultrusion method. The FRP round bar was grinded with a cutting device to form a screw thread. The screw thread was formed to have same size with the FRP bolts of Examples 1 and 2 (pitch: 1.5, M12).

For measuring the tensile strength of the FRP bolt produced in Examples and Comparative example, two steel nuts having the height of 9.8 mm were respectively fixed at each end of the FRP bolt having the length of 160 mm. Tensile strength was applied to the FRP bolt with a speed of 2.54 mm/minute in a material testing machine, and the tensile strength endured by the screw thread of the FRP bolt was measured and is set forth in Table 1.

TABLE 1

| | Tensile strength (kgf) | Improve ratio of tensile strength |
|---|---|---|
| Comparative example | 200 | 100% |
| Example 1 | 640 | 320% |
| Example 2 | 500 | 250% |

As shown in Table 1, when a screw thread is formed on the prepreg layer, the strength of the screw thread improves and the tensile strength of the FRP bolt remarkably increases. In addition, when the directions of the reinforcing fiber in the prepreg are 0 degree and 90 degree (Example 1), the tensile strength of the FRP bolt is superior to the FRP bolt of Example 2 in which the directions of the reinforcing fiber are 45 degree and −45 degree. Furthermore, when the directions of the reinforcing fiber of the FRP bolt are 0 degree and 90 degree (Example 1), the cutting process of the prepreg can be more easily carried out.

This application claims the priority benefit of Korean Patent Application No. 10-2009-0048879 filed on Jun. 3, 2009. AU disclosure of the Korean Patent application is incorporated herein by reference.

The invention claimed is:

1. A fiber reinforced plastic bolt comprising:
an internal body which includes a first reinforcing fiber unidirectionally aligned along the axis of the bolt, and a synthetic resin which is impregnated into the first reinforcing fiber, and
a hardened prepreg layer which is wound around the internal body, and includes a second reinforcing fiber and a thermosetting resin which is impregnated into the second reinforcing fiber,
wherein the hardened prepreg layer is formed by winding a prepreg having a shape of a sheet and a thickness of 0.02 to 2.5 mm around the internal body 2 to 50 turns, and a screw thread is formed on an outer surface of the hardened prepreg layer, and
wherein the volume amount of the second reinforcing fiber is 45 to 60% and the volume of the thermosetting resin is 40 to 55% based on the total volume of the prepreg.

2. The fiber reinforced plastic bolt of claim 1, wherein the first reinforcing fiber is long fiber continuously extended along the direction of the internal body.

3. The fiber reinforced plastic bolt of claim 1, wherein a distance between a root of the screw thread and the internal body is more than 0.1 mm.

* * * * *